United States Patent [19]
Alspector

[11] Patent Number: 4,874,963
[45] Date of Patent: Oct. 17, 1989

[54] NEUROMORPHIC LEARNING NETWORKS

[75] Inventor: Joshua Alspector, Westfield, N.J.

[73] Assignee: Bell Communications Research, Inc., Livingston, N.J.

[21] Appl. No.: 155,150

[22] Filed: Feb. 11, 1988

[51] Int. Cl.$^4$ .............................................. G06G 7/12
[52] U.S. Cl. .................................... 307/201; 364/807; 377/2
[58] Field of Search ................. 307/201; 364/807, 513, 364/200 MS File, 900 MS File; 377/2

[56] References Cited

U.S. PATENT DOCUMENTS

| | | | |
|---|---|---|---|
| 3,218,475 | 11/1965 | Hiltz ................................. | 307/88.5 |
| 3,273,125 | 9/1966 | Jakowatz .......................... | 340/172.5 |
| 3,287,649 | 11/1966 | Rosenblatt ......................... | 328/55 |
| 3,374,469 | 3/1968 | Connelly ......................... | 307/201 X |
| 3,394,351 | 7/1968 | Martin ............................ | 340/172.5 |
| 3,476,954 | 11/1969 | Wennik et al. .................... | 307/201 |
| 3,535,693 | 10/1970 | Connelly ......................... | 307/201 X |
| 3,950,733 | 4/1976 | Cooper et al. ................... | 340/172.5 |

OTHER PUBLICATIONS

Widrow and Winter, "Neural Nets for Adaptive Filtering and Adaptive Pattern Recognition", IEEE Computer, Mar. 1988, pp. 25–39.
"A Neuromorphic VLSI Learning System", by Joshua Alspector and T. B. Allen, In: *Advanced Research in VSLI*: Proceedings of the 1987 Standford Conference, pp. 313–349.
"Absolute Stability of Global Pattern Formation and Parallel Memory Storage by Competitive Neural Networks", M. A. Cohen and S. Grossberg, IEEE, vol. SMC-13, No. 5, Sep./Oct. 1983, pp. 815–826.
"Neural Networks and Physical Systems with Emergent Collective Computational Abilities", J. J. Hopfield, *Proc. Natl. Acad. Sci.*, vol. 79, Apr. 1962, pp. 2554–2558.
"NETtalk: A Parallel Network that Learns to Read Aloud", *The Johns Hopkins University Electrical Engineering and Computer Science Technical Report*, T. J. Sejnowski, C. R. Rosenberg, JHU/EECS-86/01.
"Contour Enhancement, Short Term Memory, and Constancies in Reverberating Neural Networks", *Studies in Applied Mathematics*, S. Grossberg, vol. LII, No. 3, Sep. 1973, pp. 213–357.
"A Logical Calculus of the Ideas Immanent in Nervous Activity", *Bulletin of Mathematical Biophysics*, W. S. McCulloch, W. Pitts, vol. 5, 1943, pp. 115–133.
"Distinctive Features, Categorical Perception, and Probability Learning: some Applications of a Neural Model", *Psychological Review*, J. A. Anderson et al., 1977, pp. 288–324.
"Learning Internal Representations by Error Propagation", *Parallel Distributed Processing: Explorations in the Microstructures of Cognition*, D. E. Rumelhart, et al., vol. 1, 1986, pp. 675–699.
"VLSI Implementation of a Neural Network Memory with Several Hundreds of Neurons", *Proceedings of the Conference on Neural Networks for Computing* American Institute of Physics, H. P. Graf et al., 1986, pp. 182–187.

(List continued on next page.)

*Primary Examiner*—David Hudspeth
*Attorney, Agent, or Firm*—James W. Falk

[57] ABSTRACT

A neuron network which achieves learning by means of a modified Boltzmann algorithm. The network may comprise interconnected input, hidden and output layers of neurons, the neurons being "on-off" or threshold electronic devices which are symmetrically connected by means of adjustable-weight synapse pairs. The synapses comprise the source-drain circuits of a plurality of paralleled FETs which differ in resistance or conductance in a binary sequence. The synapses are controlled by the output of an Up-Down counter, the reading of which is controlled by the results of a correlation of the states of the two neurons connected by the synapse pairs following the application of a set of plus and minus training signals to selected neurons of said network. A noise generator comprising a thermal noise source is provided for each neuron for the purpose of simulated annealing of the network.

12 Claims, 5 Drawing Sheets

OTHER PUBLICATIONS

"Skeleton Filters in the Brain", *Parallel Models of Associate Memory*, T. J. Sejnowski, 1981, pp. 189–212.

"A Learning Algorithm for Boltzmann Machines", *Cognitive Science* 9, D. H. Ackley et al., 1985, pp. 147–169.

"A Novel Associative Memory Implemented Using Collective Computation", *Proceedings of the 1985 Chapel Hill Conference on Very Large Scale Integration*, M. Sivilotti et al., pp. 329–342.

"Adaptive Switching Circuits", *Institute of Radio Engineers*, Western Electric Show and Convention, Convention Record, Part 4, B. Widrow, M. E. Hoff, 1960, pp. 96–104.

"Infinite-Ranged Methods of Spin-Glasses", *Physical Review*, S. Kirkpatrick et al., vol. 17, No. 11, Jun. 1, 1978, pp. 4384–4403.

NEUROMORPHIC LEARNING NETWORKS

FIELD OF THE INVENTION

The invention relates to neuron networks. These networks are circuits which function and are capable of learning in ways thought to resemble the functioning and learning mode of the human brain.

BACKGROUND OF THE INVENTION

The roots of the current work on neural networks (or models) can be found in a 1943 paper by McCulloch and Pitts, W. S. McCulloch and W. H. Pitts, "A logical calculus of ideas immanent in nervous activity", Bulletin of Mathematical Biophysics, 5, 115 (1943). There the brain is modeled as a collection of neurons with one of two states, $s_i = 0$ (not firing) or $s_i = 1$ (firing at maximum rate). If there is a connection from neuron i to neuron j, the strength or weight of this connection is defined as $w_{ij}$. Each neuron adjusts its state asynchronously according to the threshold rule:

$$s_i = \begin{bmatrix} 1 \\ 0 \end{bmatrix} \text{if } \sum_j w_{ij} s_j \begin{bmatrix} > \\ < \end{bmatrix} \theta_i \qquad (1)$$

where $\theta_i$ is the threshold for neuron i to fire.

A model of this sort formed the basis for the perception built by Rosenblatt in the early 1960s, F. Rosenblatt, "Principals of Neurodynamics: Perceptrons and the theory of brain mechanisms", Spartan Books, Washington, D.C. (1961). This perceptron consisted of an input array hard-wired to a set of feature detectors whose output can be an arbitrary function of the inputs. These outputs were connected through a layer of modifiable connection strength elements (adjustable resistors) to threshold logic units, each of which decides whether a particular input pattern is present or absent. The threshold logic units of this machine can be implemented in hardware by using a bistable device such as a Schmitt trigger, or a high-gain operational amplifier. There exists an algorithm, the perceptron convergence procedure, which adjusts the adaptive weights between the feature detectors and the decision units (or threshold logic units). This procedure is guaranteed to find a solution to a pattern classification problem, if one exists, using only the single set of modifiable weights. Unfortunately, there is a large class of problems which perceptrons cannot solve, namely those which have an order of predicate greater than 1. The Boolean operation of exclusive-or has order 2, for example. Also the perceptron convergence procedure does not apply to networks in which there is more than one layer of modifiable weights between inputs and outputs, because there is no way to decide which weights to change when an error is made. This is the so-called "credit assignment" problem and was a major stumbling block until recent progress in learning algorithms for multi-level machines.

Rosenblatt's perceptron consisted of a bank of 400 photocells each of which looked at a different portion of whatever pattern was presented to it. The photocells were connected to a bank of 512 neuron-like association units which combined signals from several photocells and in turn relayed signals to a bank of threshold logic units. The threshold logic units correlated all of the signals and made an educated guess at what pattern or letter was present. When the machine guessed right, the human operator left it alone, but when it guessed wrong the operator re-adjusted the circuits electrical connections. The effect of repeated readjustments was that the machine eventually learned which features characterized each letter or pattern. That machine thus was manually adaptive and not self-adaptive.

Another seminal idea in neural or brain models also published in the 1940s was Hebb's proposal for neural learning, D. O. Hebb, "The Organization of Behavior", Wiley, N.Y. (1949). This states that if one neuron repeatedly fires another, some change takes place in the connecting synapse to increase the efficiency of such firing, that is, the synaptic strength or weight is increased. This correlational synapse postulate has in various forms become the basis for neural models of distributed associative memory found in the works of Anderson, J. A. Anderson, J. W. Silverstein, S. A. Ritz, and R. S. Jones, "Distinctive features, categorical perception, and probability learning: Some applications of a neural model", Psych. Rev. 84, 413–451 (1977); and Kohonen, T. Kohonen, "Associative memory—A system-theoretic approach", Springer-Verlag, Berlin (1977).

Various neural transfer functions have been used in neural models. The all-or-none McCulloch-Pitts neuron is represented by a step at the threshold and can be implemented by any one of several bistable (or binary) electronic circuits. A real (or biological) neuron exhibits a transfer function comprising two horizontal lines representing zero and maximum output, connected by a linear sloping region. This characteristic is often represented by a sigmoid function shown for example in S. Grossberg, "Contour enhancement, short term memory, and constancies in reverberating neural networks, in Studies in Applied Mathematics, LII, 213, MIT Press, (1973); and T. J. Sejnowski, "Skeleton Filters in the brain", in "Parallel Models of Associative Memory", G. Hinton and J. A. Anderson (eds.), Erlbaum, Hillsdale, N.J., 189–212 (1981). An operational amplifier can be designed to have a transfer function close to the sigmoid.

Recent activity in neural network models was stimulated in large part by a non-linear model of associative memory due to Hopfield, J. J. Hopfield, "Neural networks and physical systems with emergent collective computational abilities", Proc. Natl. Acad. Sci. USA, 79, 2554–2558 (1982). These neurons are an all-or-none, i.e. bistable or two-state type with a threshold assumed to be zero. Memories, labeled k, are stored in the outer product sum over states:

$$w_{ij} = \sum_k (2s_i^k - 1)(2s_j^k - 1) \qquad (2)$$

where the $(2s-1)$ terms have the effect of transforming the $(0,1)$ neural states to $(-1,1)$ states. It is apparent that for a particular memory, $s^1$, $$\sum_j w_{ij} s_j^1 = \qquad (3)$$

$$\sum_{j \neq i} \left[ (2s_i^1 - 1)(2s_j^1 - 1)s_j^1 + \sum_{k \neq 1} (2s_i^k - 1)(2s_j^k - 1)s_j^1 \right]$$

The first summation term has mean value $(N-1)/2$ for the j terms summed over N neurons while the last term in brackets has a mean value of zero for random (and therefore pseudoorthogonal) memories when the sum over M memories (label k) is taken. Thus:

$$\sum_j w_{ij} s_j^1 \approx \frac{N-1}{2} (2s_i^1 - 1) \quad (4)$$

Since this is positive ($>\theta_i=0$) if $s_i^1=1$ and negative if $s_i^1=0$, the state does not change under the threshold rule and is stable except for the statistical noise coming from states $k \neq 1$, which has a variance of $$[(M-1)(N-1)/2]^{\frac{1}{2}}.$$

Hopfield's proposed neural network is fully connected and symmetric. This means that every neuron is connected to every other neuron by means of direct and reciprocal synapses of equal strengths or weights. Thus for every pair of neurons, i and j, $w_{ij}=w_{ji}$, but $w_{ii}=0$. Using an analogy from physics, namely the Ising model of a spin-glass, S. Kirkpatrick and D. Sherrington, "Infinite-ranged models of spin-glasses", Phys. Rev. 17, 4384–4403 (1978), we can define an "energy" or "cost", E; as $$E = -\frac{1}{2} \sum_i \sum_{j \neq i} w_{ij} s_i s_j \quad (5)$$

If one neuron, $s_k$, changes state, the energy change is;

$$\Delta E_k = -\Delta s_k \sum_{j \neq k} w_{kj} s_j \quad (6)$$

By the threshold rule, this change could only have occurred if the sign of the summation term were the same as the sign of $\Delta s_k$. Therefore, all allowed changes decrease E and gradient descent is automatic until a local minimum is reached. This energy measure is an example of a class of systems with global Liapunov functions which exhibit stability under certain conditions, M. A. Cohen and S. Grossberg, "Absolute stability of global pattern formation and parallel memory storage by competitive neural networks", Trans. IEEE SMC-13, 815, (1983). The neural states at these minima represent the memories of the system. This is a dynamical system which in the process of relaxation, performs a collective computation.

Integrated circuits implementing this type of associative memory have been made by groups at the California Institute of Technology, M. Silviotti, M. Emerling, and C. Mead, "A Novel Associative Memory Implemented Using Collective Computation", Proceedings of the 1985 Chapel Hill Conference on Very Large Scale Integration, p. 329; and at AT&T Bell Laboratories, H. P. Graf et al., "VLSI Implementation of a Neural Network Memory with Several Hundreds of Neurons", Proceedings of the Conference on Neural Networks for Computing, p. 182, Amer. Inst. of Phys., 1986. A system of N neurons has 0(N/logN) stable states and can store about 0.15N memories (N≈100) before noise terms make it forget and make errors. Furthermore, as the system nears capacity, many spurious stable states also creep into the system, representing fraudulent memories. The search for local minima demands that the memories be uncorrelated, but correlations and generalizations therefrom are the essence of learning. A true learning machine, which is the goal of this invention, must establish these correlations by creating "internal representations" and searching for global (i.e. network-wide) minima, thereby solving a constraint satisfaction problem where the weights are constraints and the neural units represent features.

Perceptrons were limited in capability because they could only solve problems that were first order in their feature analyzers. If however extra (hidden) layers of neurons are introduced between the input and output layers, higher order problems such as the Exclusive-Or Boolean function can be solved by having the hidden units construct or "learn" internal representations appropriate for solving the problem. The Boltzmann machine has this general architecture, D. H. Ackley, G. E. Hinton, and T. J. Sejnowski, "A learning algorithm for Boltzmann machines", Cognitive Science 9, 147–169 (1985). A Boltzmann machine is a neural network (or simulation thereof) which uses the Boltzmann algorithm to achieve learning. In the Boltzmann machine, unlike the strictly feed forward nature of the perceptron, connection between neurons runs both ways and with equal connection strengths, i.e. the connections are symmetric, as in the Hopfield model. This assures that the network can settle by gradient descent in the energy measure.

$$E = -\frac{1}{2} \sum_i \sum_{j \neq i} w_{ij} s_i s_j + \sum_i \theta_i s_i \quad (7)$$

where $\theta_i$ are the neuron thresholds. These threshold terms can be eliminated by assuming that each neuron is connected to a permanently "on" true unit by means of a connection of strength $w_{i\ true} = -\theta_i$ to neuron i. Thus the energy may be restated as;

$$E = -\sum_{i<j} \sum w_{ij} s_i s_j \quad (8)$$

while the energy gap or difference between a state with neuron k "off" and with the same neuron "on" is $$\Delta E_k = \sum_i w_{ki} s_i \quad (9)$$

Instead of a deterministic threshold, neurons in the Boltzmann machine have a probabilistic rule such that neuron k has state $s_k-1$ with probability;

$$P_k = \frac{1}{1 + e^{-\Delta E_k/T}} \quad (10)$$

where T is a parameter which acts like temperature in a physical system. The output of the neuron is always either 0 or 1, but its probability distribution is sigmoid, so, on the average its output looks like the sigmoid. Note that as T approaches 0, this distribution reduces to a step (on-off) function. This rule allows the system to jump occasionally to a higher energy configuration and thus to escape from local minima. This machine gets its name from the mathematical properties of thermodynamics set forth by Boltzmann.

While the Hopfield model uses local minima as the memories of the system, the Boltzmann machine uses simulated annealing to reach a global, network-wide energy minimum since the relative probability of two global states A and B follows the Boltzmann distribution;

$$\frac{P_A}{P_B} = e^{-(E_A - E_B)/T} \quad (11)$$

and thus the lowest energy state is most probable at any temperature. Since, at low temperatures, the time to thermal equilibrium is long, it is advisable to anneal by starting at high temperature and gradually reduce it. This is completely analogous to the physical process of annealing damage to a crystal where a high temperature causes dislocated atoms to jump around to find their lowest energy state within the crystal lattice. As the temperature is reduced the atoms lock into their proper places within the lattice. The computation of such annealing is complex and time-consuming for two reasons. First, the calculation involves imposing probability distributions and physical laws in the motions of particles. Second, the computations are serial. A physical crystal's atoms naturally obey physical laws without calculation and they obey these laws in parallel. For the same reasons the Boltzmann machine simulations on computers are also complex and time-consuming, since they involve the use of Eq. (10) to calculate the "on" probability of neurons. The present invention utilizes physical noise mechanisms to jitter or perturb the "on" probability of the electronic neurons.

The "credit assignment" problem that blocked progress in multi-layer perceptrons can be solved in the Boltzmann machine framework by changing weights in such a way that only local information is used. The conventional Boltzmann learning algorithm works in two phases. In phase "plus" the input and output units are clamped to a particular pattern that is desired to be learned while the network relaxes to a state of low energy aided by an appropriately chosen annealing schedule. In phase "minus", the output units are unclamped and the system also relaxes to a low energy state while keeping the inputs clamped. The goal of the learning algorithm is to find a set of synaptic weights such that the "learned" outputs in the minus phase match the desired outputs in the plus phase as nearly as possible. The probability that two neurons i and j are both "on" in the plus phase, $P_{ij}+$, can be determined by counting the number of times they are both activated averaged across some or all patterns (input-output mappings) in the training set. For each mapping, co-occurrence statistics are also collected for the minus phase to determine $P_{ij}-$. Both sets of statistics are collected at thermal equilibrium, that is, after annealing. After sufficient statistics are collected, the weights are then updated according to the relation;

$$\Delta w_{ij} = n(P_{ij}+ - P_{ij}-) \tag{12}$$

where n scales the size of each weight change.

It can be shown that this algorithm minimizes an information theoretic measure of the discrepancy between the probabilities in the plus and minus states. It thus teaches the system to give the desired outputs. An important point about this procedure is that it uses only locally available information, the states of two connected neurons, to decide how to update the weight of the synapse connecting them. This makes possible a (VLSI) very large scale integrated circuit implementation where weights can be updated in parallel without any global information and yet optimize a global measure of learning.

Recently a promising deterministic algorithm for feedforward neuron networks has been found which takes less compute time for solving certain problems, D. E. Rumelhart, G. E. Hinton and R. J. Williams, "Learning internal representations by error propagation", in Parallel Distributed Processing: Explorations in the Microstructure of Cognition, Vol. 1: Foundations, D. E. Rumelhart and J. L. McClelland (eds.), MIT Press, Cambridge, MA (1986), p. 318. This algorithm also uses a generalization of the perceptron convergence procedure in a variation due to Widrow and Hoff called the delta rule, G. Widrow and M. E. Hoff, "Adaptive switching circuits", Inst. of Radio Engineers, Western Electric Show and Convention, Convention Record, Part 4, 96–104 (1960). This rule is applied to layered feedforward networks in which only one way or forward synapses connect adjacent layers of the network. The neurons have a graded semi-linear transfer function similar to a sigmoid wherein the output, $\sigma$, is a differentiable function of the total input to the neuron. This algorithm involves first propagating the input training pattern forward to compute the values of $\sigma-$. The output is then compared to the target outputs $\sigma+$ to yield an error signal, $\sigma$, for each output unit. The error signals are then recursively propagated backward, with the synaptic weights changed accordingly. This backward error propagation will result in learning.

Both the Boltzmann and the back-propagation procedures learn. They both create the internal representations required to solve a problem by establishing hidden units as features and connections strengths as constraints. Then, by doing a global search of a large solution space, they solve the problem. While a back-propagation procedure is computationally more efficient than the Boltzmann algorithm, it is not as suitable for VLSI implementation. Firstly, in the back-propagation procedure, except for the weights feeding the final output layer of neurons, adjusting of weights requires non-local information that must be propagated down from higher layers. This necessitates synchrony and global control and would mean that weight processing could not be a parallel operation. Secondly, the network must be specified in advance as to which units are input, hidden, and output because there would have to be special procedures, controls, and connections for each layer as well as different error formulae to calculate. Thirdly, the deterministic algorithm has some unaesthetic qualities. The weights could not start at zero or the hidden units will be identical error signals from the outputs so that the weights cannot grow unequal. This means that the system must first be seeded with small random weights. This also means that if no error is made, no learning takes place. Additionally, a deterministic algorithm may be more likely to get stuck in local minima. Finally, there is no clear way to specify at what activation level a neuron is "on", or what should be the output target value without a real threshold step for the output. A real-valued floating point comparison and its backward propagation is quite difficult to implement in a parallel VLSI system although it could be accomplished by having separate specialized units for that task.

In contrast, the Boltzmann algorithm uses purely local information for adjusting weights and is suitable for parallel asynchronous operation. The network looks the same everywhere and need not be specified in advance. The neurons have two stable states, ideal for implementation in digital circuitry. The stochastic nature of the computation allows learning to take place even when no error is made and avoids getting stuck in local minima. Finally, the processes in the algorithm which take so much time on a conventional digital, serial computer are annealing and settling to equilibrium, both of which can be implemented efficiently and naturally on a chip using the physical properties of analog voltages rather than digital computation.

Prior art patents in this field include the Hiltz U.S. Pat. No. 3,218,475, issued on Nov. 16, 1965. This patent discloses an on-off type of artificial neuron comprising an operational amplifier with feedback. The Jakowatz U.S. Pat. No. 3,273,125, issued on Sept. 13, 1966 discloses a self-adapting and self-organizing learning neuron network. This network is adaptive in that it can learn to produce an output related to the consistency or similarity of the inputs applied thereto. The Martin U.S. Pat. No. 3,394,351, issued on July 23, 1968 discloses neuron circuits with sigmoid transfer characteristics which circuits can be interconnected to perform various digital logic functions as well as analog functions.

The Rosenblatt U.S. Pat. No. 3,287,649, issued Nov. 22, 1966 shows a perceptron circuit which is capable of speech pattern recognition. The Winnik et al. U.S. Pat. No. 3,476,954, issued on Nov. 4, 1969 discloses a neuron circuit including a differential amplifier, 68, in FIG. 2. The Cooper et al. U.S. Pat. No. 3,950,733, issued on Apr. 13, 1976 discloses an adaptive information processing system including neuron-like circuits called mnemonders which couple various ones (or a multiplicity) of the input terminals with various ones (or a multiplicity) of the output terminals. Means are provided for modifying the transfer function of these mnemonders in dependence on the product of at least one of the input signals and one of the output responses of what they call a Nestor circuit.

None of these patents utilize the Boltzmann algorithm or any variation thereof as part of the learning process, none utilizes simulated annealing, and none of these circuits is particularly suitable for VLSI implementation.

SUMMARY OF THE INVENTION

The invention comprises a neural network comprising circuitry which is adapted to utilize a modified and simplified version of the Boltzmann learning algorithm. The circuit design and the algorithm both facilitate very large integration (VLSI) implementation thereof. The learning algorithm involves simulated annealing whereby the network asynchronously relaxes to a state of minimum energy. The analog neurons may comprise differential amplifiers which have two stable stages, "on" or "off". Each neuron has two or more synapses connected to its inputs as well as a threshold signal. The synapses comprise variable resistors which may comprise transistors and the resistors values determine the weight or strength of the synaptic connection. The transistors comprising the synaptic weights can be switched in and out of the synaptic circuit by means of a digital control circuit.

Each neuron input thus has a voltage applied thereto which is proportional to the algebraic sum of the currents flowing through each of its weighted input synapses. If this algebraic sum is less than the threshold voltage, the neuron will remain in the "off" state, if the threshold is exceeded, it will be switched "on". The network is symmetric, which means that connected neurons are all reciprocally connected. Thus, each neuron which has an input from another neuron, has its output connected to the other neuron with an equal synaptic weight.

The simulated annealing involves perturbing the threshold signals of all neurons in a random fashion while learning or teaching signals are applied to all the neurons in one or both of the input and output layers of the network. In accordance with one feature of the invention, the perturbing random signal may be obtained from an electrical noise generator which may be easily implemented on-chip.

The network comprises, for each pair of connected neurons, a digital control circuit for measuring the correlation of each pair of connected neurons following each application of the pair of training signals of the plus and minus phases, as explained above. A positive correlation results if both neurons are in the same state and a negative correlation results if they are in different states. If both the correlations of the plus and minus phases are the same, the synaptic weight is left unchanged but if they are different the weights are either increased or decreased, depending on the relative values of the plus and minus phase correlations.

Any one of the unused neurons may function as a threshold source. This so-called "true" neuron is permanently "on" and is connected to the input of each active neuron through an adjustable resistor which applies a voltage (or current) to each neuron input equal to the desired threshold, but of the opposite polarity. The neurons are then biased to fire or change from "off" to "on" when the sum of its inputs reaches zero.

A chip implementing this invention may comprise N neurons and N(N-1)/2 pairs of synapses, with a separate logic and control circuit for each synaptic pair. Each neuron also has a noise source connected thereto. This circuitry permits a fully connected network, which means that each neuron can be connected to every other neuron. Fully connected networks are rarely needed. Most networks comprise input, hidden and output layers of neurons wherein the neurons of all layers are connected only to the neurons of the adjacent layer. Thus in using the potentially fully connectable network of the present invention, the desired network configuration is determined and then the undesired synaptic connections are deleted simply by setting their weights to zero, i.e. by opening the synaptic circuit.

Alternatively, a circuit may be designed for less than full connectivity and the synapse pairs connected to the neurons by means of switches to set up any desired network. These switches can be on-chip electronic switches actuated by external control signals.

It is thus an object of the invention to provide an electronic neuron network suitable for VLSI implementation, comprising a plurality, N, of bistable (on-off) neurons, N(N−1)/2 pairs of adjustable strength synapses each comprising a variable resistor, each pair of synapses having a digital control circuit associated therewith, said control circuits comprising logic means to measure and record the correlation of each pair of connected neurons after the application of plus and minus phase training signals to said network and after the simulated annealing of said network during the application of said training signals by means of a variable amplitude electronic noise signal, and means to adjust the synaptic weights of each connected pair of neurons in accordance with the results of said correlation.

Another object of the invention is to provide a neuron network of the type which is capable of learning by means of a novel Boltzmann algorithm in which the network relaxes by means of simulated annealing during the application of training signals thereto, said network comprising means to achieve said simulated annealing by perturbing the threshold voltages of each of said neurons with a separate electronic noise signal which varies from a high amplitude to a low amplitude during each annealing cycle.

Another object of the invention is to provide a novel learning method for a neuron network which network utilizes simulated annealing to relax to a low energy state, said method comprising the steps of, correlating the states of each pair of connected neurons following each cycle of simulated annealing, then adjusting the synaptic weights of each of said pairs of neurons using only the correlation data obtained from said connected pairs of neurons.

DETAILED DESCRIPTION

Neural network architectures are seen by their proponents as a way out of the limitations evidenced by current mainstream artificial intelligence research based on conventional serial digital computers. The expected hope is that these neural network architectures will lead to the kind of intelligence lacking in machines but which humans are known to be good at, such as pattern recognition, associative recall, fault tolerance, adaptation, and general purpose learning. As an example, we find it easy to recognize another human face, can associate with that face a name, address, taste in clothes, favorite foods and a whole host of other attributes within a split second of seeing that face. This would be true even if we hadn't seen that person in a long time or if some of our neurons had been damaged as a result of excessive drinking. It would still be true if that person had aged or otherwise changed his appearance somewhat. This same pattern recognition machine is capable of learning many other tasks from weeding gardens to playing tennis to medical diagnosis to mathematical theorem proving. We would not expect a database system to correctly or instantly recall faces especially if they change. Nor could a medical diagnosis expert system learn other tasks especially if some of its transistors are malfunctioning. Current artificial intelligence machines, techniques and programs are very domain specific and inflexible, requiring careful programming.

In contrast, neural networks require no programming, only training and "experience". Their knowledge is not localized in specific memory locations but is distributed throughout the network so that if part of the network is damaged, it may still function nearly as well as before. Associative recall is quick in the networks described due to the collective nature of the computation and will work even in the presence of somewhat incorrect or partial information. The networks are not domain specific but could be trained on any input-output pattern. As conditions change, these networks adapt as a result of further "experience". Research in neural network applications is currently limited by the practical complexity of the network since the simulations on digital serial computers are very slow. By realizing these networks in hardware, and using physical and parallel processes to speed up the computation, which is the aim of this invention, further research in neural net algorithms and architectures will be expedited.

One possible application is a system that reads written words. Perhaps the most impressive application of neural architectures to date is the example of NET talk, T. J. Sejnowski and C. R. Rosenberg, "NETalk: a parallel network that learns to read aloud", John Hopkins technical report JHU/EECS-86/01. Here, a network of about 300 neurons learned to associate strings of English characters with the sounds they made after being trained on a 20,000 work vocabulary. One could easily imagine adding another step in the training so that various fonts could be recognized by an optical reader as the characters. It may be possible to include handwritten characters eventually. It is easy to imagine training for different languages and dialects. The result would be a system which could read written documents and convert them to voice for transmission over phone lines, for blind people, or for "listening" to memos while driving your car.

A general class of problems well suited for neural architecture solutions is the class of optimization problems of high complexity such as the traveling salesman problem. The problem of routing telephone calls through a multiplicity of trunks or scheduling packets in data communications are special cases of such a class of problems. A neural chip can be programmed or can learn to make such complex decisions quickly.

Neural architectures are also suited to many problems in traditional artificial intelligence application areas. These include natural language understanding, pattern recognition, and robotics. Unlike LISP programs, however, the learning that neuromorphic systems are capable of is not domain specific but rather general purpose. The differences are mainly in the input-output systems.

In designing the present electronic neural network, the physical behavior of the electronics has been used to advantage together with the maximum use of parallelism. The sigmoidal probability distribution has a close electronic analogy in a noisy voltage step. The probability for a neuron to be "on" using the sigmoid distribution is the same within a few percent as the probability for a deterministic "step" neuron to be "on" when its threshold is smeared by Gaussian noise. So another way of looking at annealing is to start with a noisy threshold and gradually reduce the noise. The present invention utilizes the thermal noise inherent in electronic circuits to implement the noisy threshold required for annealing. The thermal noise follows the Gaussian distribution. Prior art computer simulations of the Boltzmann machine have simulated noisy thresholds by generating a different sequence of random numbers for each neuron. This was time-consuming in that a single digital computer had to perform this random number generation in sequence for each neuron to be annealed. The present invention provides a separate and therefore uncorrelated noise source for each neuron in the network, and the annealing of all neurons takes place simultaneously.

Figure 1:
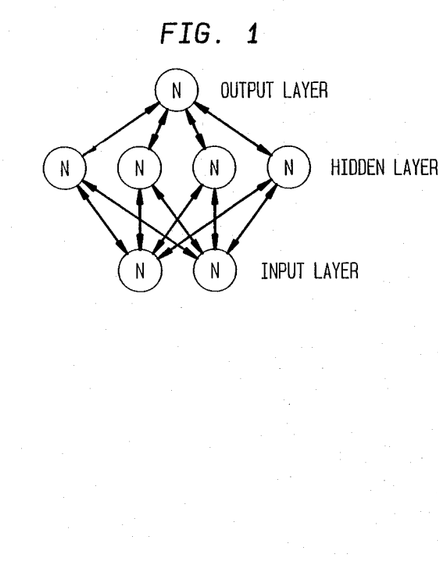
FIG. 1 is a diagram of a simple neural network.

FIG. 1 shows a simple neural network comprising input, hidden and output layers of neurons, labeled N. The input layer comprises two neurons, the hidden layer, four; and the output layer a single neuron. The lines with the double-headed arrows indicate symmetrical synaptic connections between the neurons. Such a network comprises a simple Boltzmann machine which can be taught to solve the Exclusive-Or function or problem. At the conclusion of the learning process, the output neuron will be firing, or "on" whenever the two input neurons are in different states; and not firing if the two input layer states are the same. The training patterns applied during the learning process would be based on the Exclusive-Or truth table which is to be learned by the network. Thus during the plus phase of the training procedure, both the input and output layer neurons are clamped in the desired states in accordance with the truth table, the annealing is then accomplished by means of noise signals which start at a high amplitude and are gradually reduced to zero amplitude; the correlations of the connected neurons are then measured and temporarily stored. In the minus phase this process is repeated with only the input neurons clamped. The plus and minus correlations are then compared and the synaptic connections updated in accordance with the results of this comparison.

Figure 2:
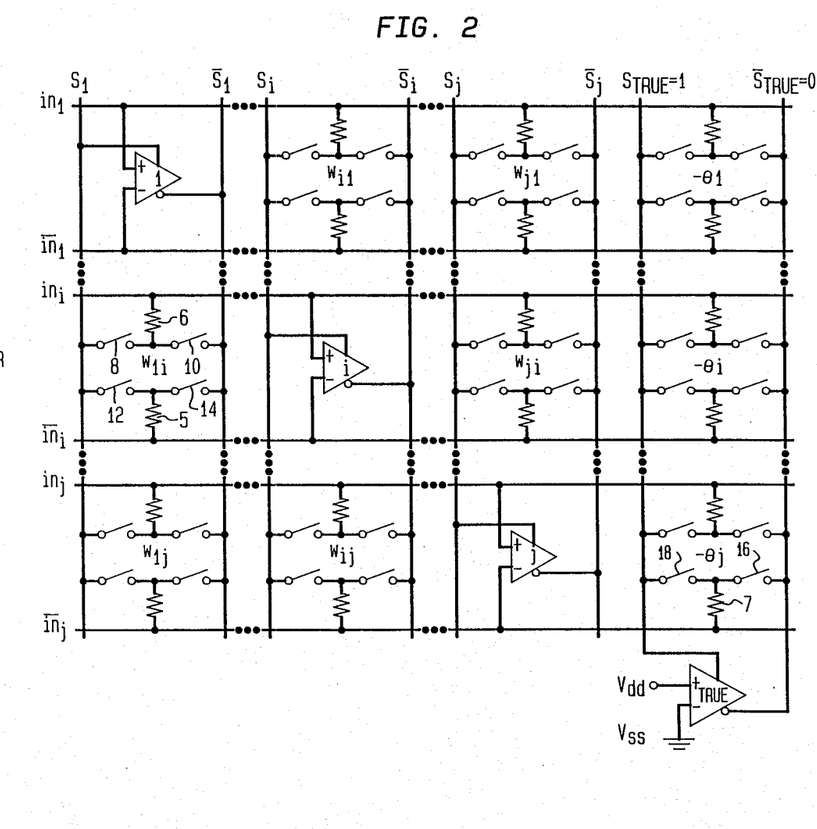
FIG. 2 is a connectivity diagram of the neural network of the present invention.

FIG. 2 illustrates the connectivity but not necessarily the layout of a VLSI chip which is designed for full connectivity, as defined above. Three neurons, labeled 1, i and j are shown, together with six pairs of synaptic weights, $w_{1i}$, $w_{1j}$, etc. Each neuron is a differential amplifier with complementary outputs s and $\bar{s}$. The s output may for example be +5 volts when the neuron is firing and zero volts when it is not firing. The $\bar{s}$ output has the complementary or opposite voltages. Each neuron occupies a different column, and vertical s and $\bar{s}$ lines run down each column from the outputs of the neurons therein. The horizontal in and $\overline{in}$ lines connect the neuron inputs to the outputs of one or more other neurons. These output lines s and $\bar{s}$ are connected to the inputs of all other neurons through the weight resistors, for example 5, which bridge the output and input lines of each pair of neurons. For positive synaptic weights connecting any two neurons, for example neurons i and j, $s_j$ would be connected to $in_i$ or $\bar{s}_j$ to $\overline{in}_i$. For negative weights, $\bar{s}_j$ would be connected to $in_i$ or $s_j$ to $\overline{in}_i$. A positive synaptic weight is an excitatory input which tends to fire the neuron and a negative weight is an inhibitory input which tends to keep the neuron in the "off" state. The neuron labelled "true" is permanently "on" to provide a fixed voltage at its s output. The weights leading from the true neuron to the active neurons represent the negative of the thresholds, $-\theta$. Thus the resistive weight 7 applies to one of the inputs of neuron j a voltage equal in magnitude to the desired threshold of this neuron. If this threshold is applied to the negative or $\overline{in}_j$ input of neuron j by closing switch 18 the algebraic sum of all the other inputs from the neurons connected thereto must equal or exceed this threshold before the neuron fires. Thus this is a positive threshold. If switch 16 is closed and 18 opened, the threshold would be negative. Thus the threshold becomes just one of many of the neurons inputs. The neurons are all designed with their steps at zero input volts, which means that if the algebraic sum of the inputs, including the threshold input, is below zero, the neuron will be "off" and if the sum is above zero, the neuron will be "on.

Figure 5:
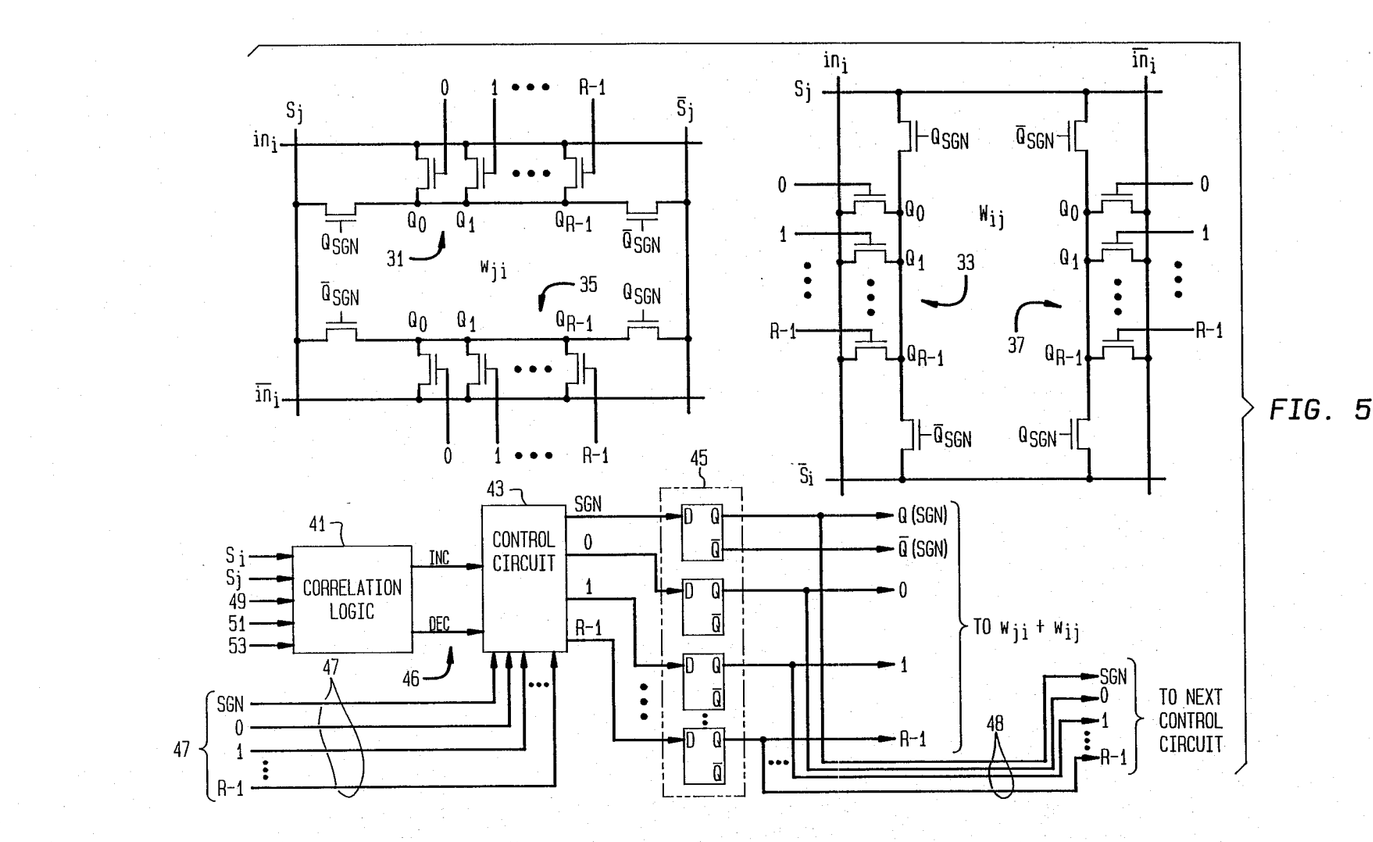
FIG. 5 shows a pair of adjustable synapses and the circuitry for the adjustment thereof.

All of the synapses of FIG. 1 are similar and synapse $W_{1i}$ which connects the output of neuron 1 to the input of neuron i will be described in detail. The resistive weight 5 is connected at one end to the negative input line $\overline{in}_i$ or neuron i. The other end of 5 can be connected to either the positive ($s_1$) or negative ($\bar{s}_1$ output of neuron 1 depending on which one of the two switches 12 or 14 is closed. Similarly, weight 6 can be connected from either $s_1$ or $\bar{s}_1$ to $in_i$ depending on whether switch 8 or 10 is closed. Thus by closing one of these four switches, either a negative or positive weight or synapse can be implemented and a desired combination of the output of neuron 1 to the input of neuron i can be achieved. Additional details of the operation of these adjustable weight synapses are shown in FIG. 5.

Figure 3:
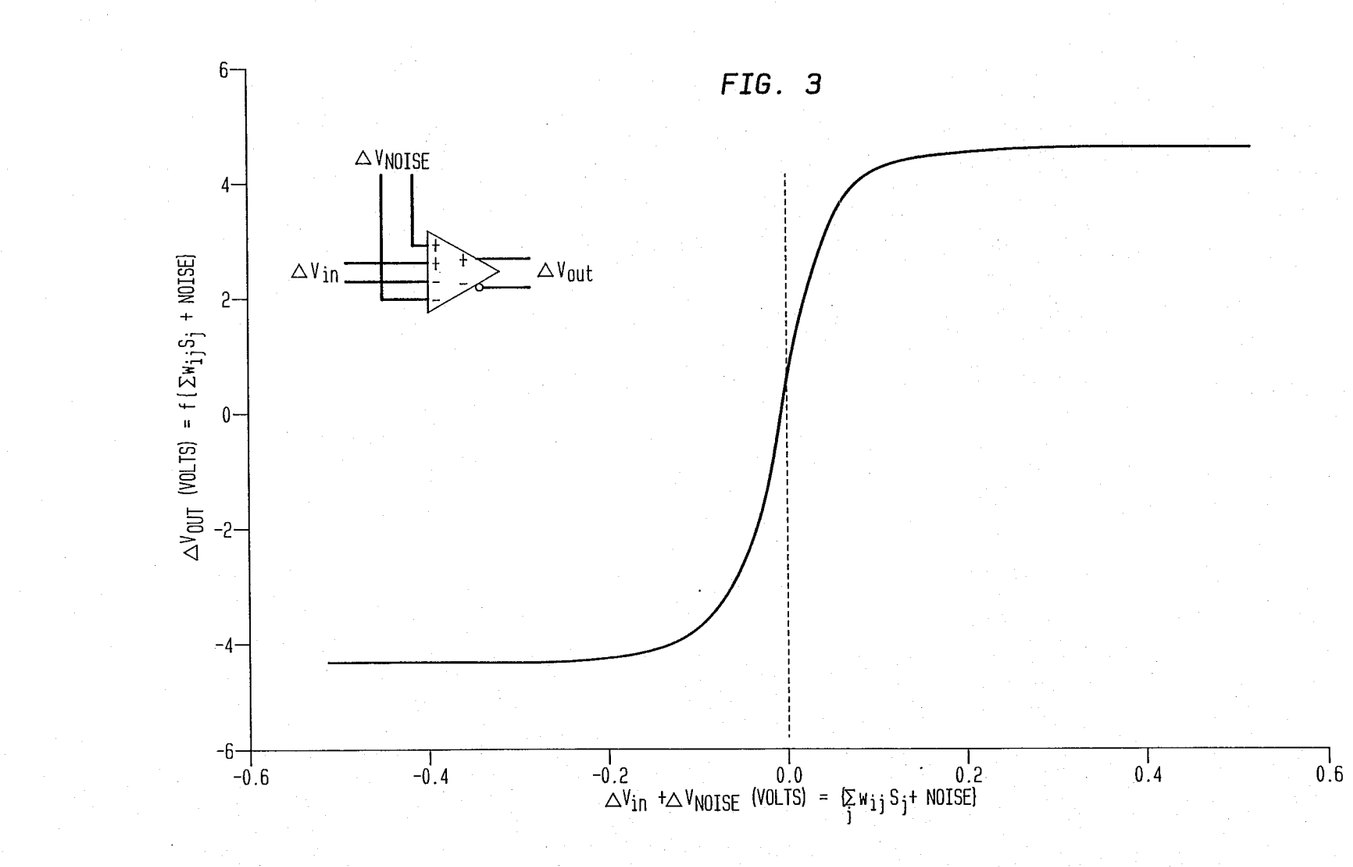
FIG. 3 is a transfer characteristic of an "on-off" neuron.

FIG. 3 shows a typical transfer characteristic of a neuron which comprises a differential amplifier, which neuron is preferred for the neuron network of the present invention. This transfer characteristic is of the step or bistable type in which the neuron is "off" if the net input voltage at its two inputs is less than zero and "on" if it is above zero. An ideal step function neuron would have a vertical step between the "on" and "off" states but practical circuits will exhibit a narrow transition area between these two states, as illustrated in FIG. 3. During annealing, the Gaussian noise signal may cause the neuron to switch states. For example, if the algebraic sum of the neuron inputs, including the threshold, is close to zero, a small noise peak can cause a change of states. Also, if the same algebraic sum is either substantially above or below zero, a high amplitude noise pulse can cause a change of state. As stated above, the perturbing of a step threshold with Gausian noise yields an approximately sigmoidal probability distribution.

Figure 4:
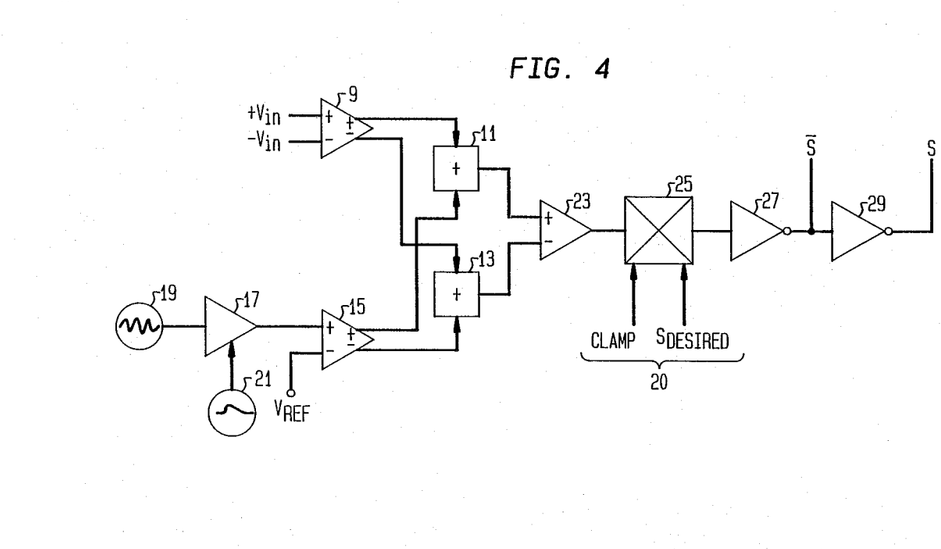
FIG. 4 is a block diagram of one type of neuron which may be utilized in the present invention.

FIG. 4 is a block diagram of each of the differential-amplifier type which may comprise the present network, including its noise source. The differential amplifier 9 has plus and minus inputs to which the weighted inputs $+V_{in}$ and $-V_{in}$ are applied. These are the inputs from the outputs of all other connected neurons and from the true neuron. The variable-gain amplifier 17 receives a noise generated in its input resistor. The gain of amplifier 17 is controlled by a signal from ramp signal generator 21, shown with a ramp wave form which starts high and decreases to zero. This signal thus provides a large initial noise voltage at the output of 17. The annealing time may be problem-dependent, thus it is advisable that the signal of generator 21 be supplied from an external source. The differential amplifier 15 has the ramp-noise signal from 17 applied to its plus input and a dc reference voltage to its negative input. The push-pull noise outputs from 15 are added to the outputs of amplifier 9 in summing nodes 11 and 13. The summed signals from 11 and 13 are applied to the plus and minus inputs of differential amplifier 23, the single output which is applied to control circuit 25. The inverted output $\bar{s}$ appears at the output of inverter 27 and the output s at the output inverter 29. The two inverters are connected in cascade, as shown. The circuit 25 is used to clamp the neuron in either of its states when an external "clamp" signal is applied thereto together with the desired clamping state (S desired). These two signals are labeled 20.

At the positive input of such a differential neuron there is a total synaptic conductance tending to pull up to voltage $V_{on}$, representing the absolute value of the sum of positive weights from neurons whose state is "on" and negative weights from neurons which are "off". The conductance pulling down to $V_{off}$ sums the negative weight from "on" neurons and positive weights from "off" neurons. At the negative input, the pull up and pull-down conductances are interchanged. Therefore at neuron i we have the comparison $$\sum_{j, s_j \text{on}} |w_{ji} > 0| + \sum_{j, s_j \text{off}} |w_{ji} < 0| > \sum_{j, s_j \text{on}} |w_{ji} < 0| + \quad (13)$$
$$\sum_{j, s_j \text{off}} |w_{ji} > 0|$$

If we adopt the convention $s_j = +1$ if the neuron is "on" and $s_j = -1$ if it is "off", and if we remember that one of the weights to neuron i is from the true unit with $w_{i\ true} = -\theta_i$, this reduces to;

$$\sum_j w_{ij} s_j > \theta_i \quad (14)$$

for the comparison. This just implements the threshold rule of Eq. (1), as desired.

Note that this could be done by comparing the + input against a threshold of $\frac{1}{2}(V_{on} + V_{off})$ but this would require perfectly matched transistors. The complementary differential nature assures symmetry even if the match is imperfect, thus shifting the operating point slightly from the center of the voltage range. The differential amplifier circuitry also rejects common mode noise which is later added in a controlled way.

FIG. 5 shows logic and control circuitry which would be provided on the VLSI chip to automatically change the synaptic weights following the application of each set of input-output training sets or patterns to the network. If a weight change is indicated by the correlation data the synaptic weights are changed by plus or minus one unit of conductance. The synapses for connecting the output of neuron i to the input of neuron j are indicated as $w_{ij}$ and the reciprocal synaptic connections for the same pair of neurons are indicated as $w_{ji}$. The synapse $w_{ji}$ comprises two sets of field effect transistors (FETs) with their source-drain circuits connected in parallel, so that each set of FETs comprises an adjustable synaptic weight. For example, the source-drain circuits of FETs $Q_0, Q_1, \ldots Q_{R-1}$ of synapse 31 are connected in parallel from line $in_i$ to transistors $Q_{SGN}$ and $\overline{Q}_{SGN}$. The paralleled transistors have sizes or conductances with ratios of 1:2:4:8, etc., so that the total parallel resistance (or conductance) can have $2^R$ digital values, depending on which combination of the R parallel transistors is switched on by signals applied to the gate electrodes thereof. The FET $Q_{SGN}$ of synapse 31 connects the paralleled transistors thereof to the positive output $s_j$ of neuron j, and thus, when this transistor is switched on by a positive signal at its gate, a positive synapse results between $s_j$ and $in_i$. If the transistor $\overline{Q}_{SGN}$ of synapse 31 is similarly switched on, a negative synapse results between $\bar{s}_j$ and $in_i$. The other synapse 35 of $w_{ji}$ is similar. If transistor $\overline{Q}_{SGN}$ of synapse 35 is gated on, $s_j$ will be connected to $\overline{in}_i$ to form a negative synapse. If $Q_{SGN}$ is gated on, a positive synapse results which connects $\bar{s}_j$ to $\overline{in}_i$. The other synapse $w_{ij}$ is similar in circuitry and function to $w_{ji}$.

A set of R+1 lines 47 and 48 runs throughout the chip and is connected to each control circuit, such as control circuit 43, which is associated with each synapse pair. The lines 47 and 48 comprise a sign line SGN and R binary bit lines. The signals on these lines are used to set the synaptic weights prior to learning and can also be used for reading them out after learning. The control circuit has its outputs connected to each of the stages of Up-Down counter 45, which counter controls the conductivity of the FETs which determine the synaptic weights. The counter comprises sign stage SGN and R stages 0-(R-1) for synaptic magnitude. The outputs of counter 45 are connected to the gate electrodes of all four sets of the transistors $Q_0-Q_{R-1}$, as shown and to lines 48.

When setting the initial synaptic weight, an R+1 bit signal is applied to lines 47 together with a strobe or control pulse which may form one of the inputs of correlation logic circuit 41. These R+1 bits will pass through circuit 43 and will be applied to the stages of counter 45 in parallel. Upon the occurrence of the next strobe pulse, the contents of counter 45 will be shifted out via lines 48 to the next control circuit of the network to be loaded into its counter corresponding to counter 45. Thus the initializing bits are shifted through the network and when the Up-Down counter of the final control circuit is reached, each synapse will have been set to its desired value. Thus the lines 47, 48 and all of the counters like 45 throughout the network comprise a shift register during the initialization.

The biary values of the Q(SGN) and $\overline{Q}$(SGN) outputs of counter 45 determine which sign of the synapses 31 or 35 of $w_{ji}$ and 33 or 37 of $w_{ij}$ are utilized. The synaptic weight magnitudes of all these synapses are the same for any given reading of counter 45. If, for example, the synaptic sign is positive, Q(SGN) would be binary one and $\overline{Q}$(SGN) binary zero. For such positive synapse $s_j$ will connect to $in_i$ and $\bar{s}_j$ will connect to $\overline{in}_i$. The FET Q(SGN) acting as a switch would therefore be "on" or conducting if Q(SGN) from counter 45 is binary one and "off" or non-conducting if $\overline{Q}$(SGN) from the counter is binary zero. The FET $\overline{Q}$(SGN) would have the complementary sense. Therefore synapse 31 will connect to $s_j$ while synapse 35 will connect to $\bar{s}_j$. Similarly, if $\overline{Q}$SGN is binary one and Q(SGN) binary zero, a negative synapse would result. In that case $s_j$ will connect to $\overline{in}_i$ and $\bar{s}_j$ will connect to $in_i$.

The correlation logic 41 comprises circuitry for measuring the correlation of the connected neurons i and j, following each cycle of annealing. The positive phase correlation, $C^+$, occurs after the plus phase annealing cycle during which both input and output neurons are clamped, and the negative corelation, $C^-$, follows the negative phase annealing cycle during which only the input neurons are clamped. These correlations will be positive or +1 if the two connected neurons are in the same state and negative or -1 if they are in different states. Thus this correlation can be performed by a simple Exclusive-Or gate to which the neurons outputs $s_i$ and $s_j$, are applied. The logic circuit 41 contains circuitry for storing the results of the plus phase correlation, to determine whether the synaptic weights should be increased, decreased or left unchanged. In accordance with the modified and simplified Boltzmann algorithm utilized in the present invention, if the two correlations are the same, the weights are unchanged, if the positive phase correlation is greater than the negative phase correlation a single binary bit increase in the synaptic weight is required. For the opposite conditions wherein the positive phase correlation is the smaller of the two, the register 45 is decremented by one binary bit to similarly decrement each synapse. Simple logic circuitry can accomplish these operations to yield the increment or decrement signals on lines 46 which control the reading of Up-Down counter 45. The neuron state lines $s_i$ and $s_j$ are applied to logic circuit 41 together with other control leads 49, 51, and 53, for carrying phase information (plus or minus) and various strobe or control signals.

It is apparent that the simplified learning algorithm of the present invention in which only the states of each pair of connected neurons are correlated following each plus and minus phase of the training patterns is a much simpler one than the original or conventional Boltzmann algorithm. Implementing the original Boltzmann algorithm would require more complex circuitry as well as more operating time.

Figure 6:
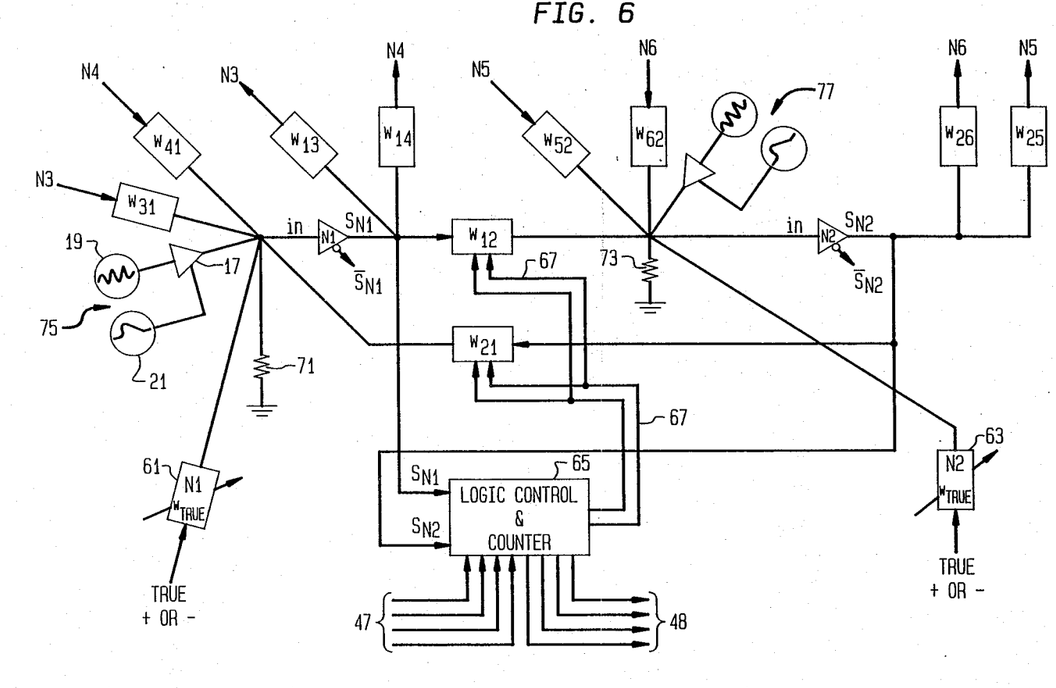
FIG. 6 is a block diagram showing a pair of symmetrically connected neurons and the auxiliary circuitry thereof.

FIG. 6 shows the circuitry for symmetrically interconnecting a pair of neurons N1 and N2. These neurons are shown as having single inputs, in. These neurons may comprise single-input high-gain operational-type amplifiers which are biased to yield a step at approximately zero input voltage, so that the outputs $s_{N1}$ and $s_{N2}$ thereof will be zero if the algebraic sum of the inputs is below zero and some positive voltage, e.g. +5 volts, if the total input voltage exceeds zero. The inverse outputs $\bar{s}_{N1}$ and $\bar{s}_{N2}$ will exhibit the inverse of the voltages at the aforementioned direct or uninverted outputs. The neuron N1 is shown symmetrically connected to two other neurons, N3 and N4 and the neuron N2 is similarly connected to two other neurons N5 and N6.

The input resistor 71 of neuron N1 has applied thereto a threshold current from the true variable resistor (or synapse) 61 to which a fixed voltage is applied from a line labeled "True". This true voltage may be positive or negative and is selected as the opposite polarity of the desired threshold voltage of the neuron, as explained above. The input resistor 71 or N1 receives inputs from the outputs of neurons N3 and N4 (not shown) via the synapses $w_{31}$ and $w_{41}$, respectively. The noise generator 75 comprises noise source 19 and variable-gain amplifier 17 and signal generator 21. The amplifier 17 produces an output which is applied to the input resistor of N1 during each annealing cycle. The signal generator 21 may be external to the chip and common to all of the noise generators of the network.

The output impedance of all the neurons is made low so that the current applied to the input resistors through each of the resistive synapses is proportional to the synaptic weight or conductance. Thus the input resistors, such as 71 and 73 perform an analog addition through the use of very simple circuitry. Further, all of this analog addition takes place simultaneously without the necessity of any network-wide (or global) control signals.

In FIG. 6, $w_{12}$ is the direct synapse connecting the uninverted output $s_{N1}$ of N1 to the input of N2, and $w_{21}$ is the reciprocal synapse connecting the output $s_{N2}$ of N2 to the input N1. The circuit 65 and lines 67 comprise the digital logic, control and counter circuits shown in more detail in FIG. 5. The lines 47 and 48 comprise the network-wide lines which are used to set the synapse weights and read out these weights. The threshold for N2 is supplied by weight 63 which connects a true neuron. The output $s_{N1}$ of N1 has the synapse $w_{13}$ connected thereto. This synapse connects to the input of neuron N3, not shown. Synapse $w_{14}$ connects the output of N1 to the input of N4, not shown. Synapses $w_{26}$ and $w_{25}$ connect the outputs of N2 to the inputs, respectively, of N6 and N5, not shown. The noise generator 77 is connected to the input of N2.

The neurons of FIG. 6 have no clamping circuits and thus it would comprise one of the hidden pairs of neurons. The neuron pairs of the input and output layers would be the same as FIG. 6 with the addition of the clamping circuitry illustrated in FIG. 4.

While differential amplifier type neurons are preferred for this invention for reasons stated above, the single-input amplifier of FIG. 6 can also be used to advantage in practicing the invention.

While the invention has been described in connection with illustrative embodiments, obvious variations therein will be apparent to those skilled in the art without the exercise of invention, accordingly the invention should be limited only by the scope of the appending claims.

What is claimed is:

1. A neuron network comprising interconnected input, hidden and output layers of neurons, said neurons comprising "on-off" or threshold electronic devices, all of said neurons which are connected being symmetrically connected by means of automatically-adjustable synapse pairs, each of said synapses comprises a plurality of drain-source circuits of field effect transistors, said source-drain circuits having resistances or conductances which differ from each other by ratios of 2 to 1, whereby different combinations of said source-drain circuits can be switched in parallel to provide any resistance or conductance, in a binary sequence, for each of said synapses, said synapses being controlled by the output of an Up-Down counter, and means to control the reading of said counter depending on the results of a correlation of the states of each connected pair of said neurons following the application of sets of training signals to said neurons network.

2. The network of claim 1 wherein each neuron is provided with a circuit for accomplishing simulated annealing, said circuit comprising means to perturb the threshold of each of said neurons by means of amplified thermal noise which, during each annealing cycle, starts at a high amplitude and decreases in ramp-fashion to a zero amplitude, whereby the network simultaneously relaxes to a state of minimum energy during the application of said training signals.

3. The network of claim 1 wherein each of said neurons comprises a differential amplifier.

4. An electronic neuron network comprising a plurality of step-function or "on-off" electronic neurons arranged in input, hidden and output layers, which neurons comprise differential amplifiers, selected pairs of the neurons of said network being connected by means of pairs of synapses, digital control circuitry for automatically varying the synaptic weight of each of the synapses of said pairs of synapses, in unison, means to apply plus and minus phase training patterns to the neurons in the input and output layers of said network, means to apply uncorrelated Gaussian thermal noise to each of said neurons to accomplish simulated annealing during the application of said plus and minus phase training patterns, said noise varying in ramp-fashion from a high to a low amplitude during each annealing cycle, and a logic circuit provided for each connected pair of neurons, said logic circuit comprising means to measure the correlation of each of the said plus and minus phase training patterns and means to control said digital control circuitry in accordance with the results of said correlations.

5. The network of claim 4 wherein said synaptic weights comprise the source-drain circuits of a plurality of field effect transistors of different resistances or conductances with a conductance sequence of 1:2:4 etc., and wherein the synaptic weights are varied by switching different combinations of said source-drain circuits in parallel.

6. A neuron network comprising,
a plurality of step neurons,
means to symmetrically connect said neurons by means of direct and reciprocal variable-weight synapses,
means to apply sets of training signals to selected ones of the neurons of said network,
each of said neurons being provided with a separate and thus uncorrelated source of thermal noise, means to apply said thermal noise to each of said neurons to accomplish simulated annealing of said network during the application of each of said training signals,
means to correlate the states of said connected neurons following the application of each of said training signals, and
means to automatically adjust said synapses in response to said correlations.

7. The network of claim 6 wherein each of said neurons comprises a differential amplifier with the step therein at zero differential input volts and wherein one input of each of said neurons comprises a threshold voltage which is the inverse of the desired threshold of that neuron, said threshold voltage being derived from a permanently "on" true neuron.

8. A method for teaching a neuron network to recognize input patterns repeatedly applied thereto, which network utilizes simulated annealing to relax to a state of low energy, said method comprising the steps of; correlating the states of each pair of connected neurons following each cycle of simulated annealing, then adjusting the synaptic weights of each of said pairs of neurons by the minimum step of said synaptic weight using only the correlation data obtained from said connected pairs of neurons.

9. A neuron network comprising input, hidden and output layers of neurons, said neurons comprising "on-off" or bistable electronic devices, and wherein all connected neuron pairs are symmetrically connected by means of pairs of automatically adjustable resistors which comprise synapses of adjustable weight;
means to sequentially apply plus and minus phase training signals to said network,
means to achieve simulated annealing of said network during the application of said training signals,
each pair of connected neurons having associated therewith a logic and control circuit for obtaining correlation figures related to the states of each of said pairs of connected neurons following the simulated annealing of said network during each application of said plus and minus training signals, said correlation figures being positive (+1) if the states of said two connected neurons are both the same and negative (−1) if the states thereof are different, and
an Up-Down counter controlled by said control circuit, said counter controlling the weight of each of said pair of synapses,
said logic and control circuitry comprising means to increment said counter and said synaptic weights if the said correlation following said plus phase is greater than the said correlation following said minus phase, and also means to decrement the reading of said counter and the weight of each said pair of synapses if the correlation following said plus phase is less than the said correlation following said minus phase, and leaving said synaptic weights unchanged if the said plus and minus correlations are the same.

10. A neuron network comprising bistable electronic neurons, means to sequentially apply plus and minus phase training signals to said network, means to apply a different electronically-generated noise signal to each of said neurons during each application of said plus and minus phase training signals, each pair of connected neurons being connected by means of adjustable-weight synapses, and means to automatically adjust the synaptic weights of each of said pairs of connected neurons following each cycle of application of said training signals by comparing only the correlation of the states of each said connected neuron pair.

11. A neuron network adapted to utilize a Boltzmann algorithm to accomplish learning, said network comprising means for performing simulated annealing, said means comprising separate electronic noise generators connected to the inputs of each neuron in said network, the amplitude of the noise output of said noise generators being adjustable to accomplish simulated annealing.

12. The network of claim 11 wherein said noise generators comprise a thermal noise source which is connected to the input of a variable-gain amplifier, the gain of said amplifier being controlled by a ramp signal generator which during each annealing cycle starts at a high voltage and decreases to a low voltage, whereby the noise at the output of said amplifier starts out with a high amplitude and decreases toward zero amplitude.

* * * * *

UNITED STATES PATENT AND TRADEMARK OFFICE
CERTIFICATE OF CORRECTION

PATENT NO. : 4,874,963

DATED : October 17, 1989

INVENTOR(S) : Robert Burnell Allen
Joshua Alspector

It is certified that error appears in the above-identified patent and that said Letters Patent is hereby corrected as shown below:

Title page,
item [75], Inventor: before "Joshua Alspector", insert
-- Robert Burnell Allen
Basking Ridge, NJ--

Signed and Sealed this

Twenty-second Day of February, 1994

*Attest:*

BRUCE LEHMAN

*Attesting Officer*     *Commissioner of Patents and Trademarks*